H. J. HARRIS.
METHOD OF AND MEANS FOR CONNECTING AND MAINTAINING VESSELS IN BROADSIDE RELATION.
APPLICATION FILED NOV. 19, 1915.

1,195,007.  Patented Aug. 15, 1916.

Inventor
Henry J. Harris

Witnesses
E. Q. Ruppert
A. F. Stevens

By Victor J. Evans
Attorney

UNITED STATES PATENT OFFICE.

HENRY J. HARRIS, OF YOUNGSTOWN, OHIO.

METHOD OF AND MEANS FOR CONNECTING AND MAINTAINING VESSELS IN BROADSIDE RELATION.

1,195,007.  Specification of Letters Patent.  Patented Aug. 15, 1916.

Application filed November 19, 1915. Serial No. 62,357.

*To all whom it may concern:*

Be it known that I, HENRY J. HARRIS, a citizen of the United States, residing at Youngstown, in the county of Mahoning and State of Ohio, have invented new and useful Improvements in Methods of and Means for Connecting and Maintaining Vessels in Broadside Relation, of which the following a specification.

This invention relates to a method of and means for connecting and maintaining vessels in broadside relation for towing or coaling purposes while one vessel is being towed by the other or both vessels are moving forward each under its own power.

The primary object of the invention is to provide a method of and means for connecting two vessels and maintaining the same in substantially parallel relation at fixed distances apart while the vessels are moving ahead in order that one vessel may be towed by the other without fouling; and an established relationship be kept up, with respect to lateral distance and rate of travel, between the vessels while one is being coaled from the other and while both vessels are traveling at a desired speed under the driving power of one vessel or under the combined driving powers of both vessels, so that the operation of towing or coaling may be carried out under better conditions and with less trouble, inconvenience and danger than is possible under the ordinary practice of arranging one of the vessels astern of the other.

A further object of the invention is to provide a method of and means for connecting and maintaining two vessels in substantially parallel relation which embodies the use of drawing and restraining connections between the vessels for effecting their movement ahead at the same rate of speed and preventing their lateral separation beyond a determined degree, and the use of resisting means acted upon by the water for resisting relatively inward movement of the vessels and maintaining them the prescribed distance apart.

The invention consists of the features of construction, combination and arrangement of parts, and certain steps of operation, hereinafter fully described and claimed, reference being had to the accompanying drawing in which:—

Figure 1:
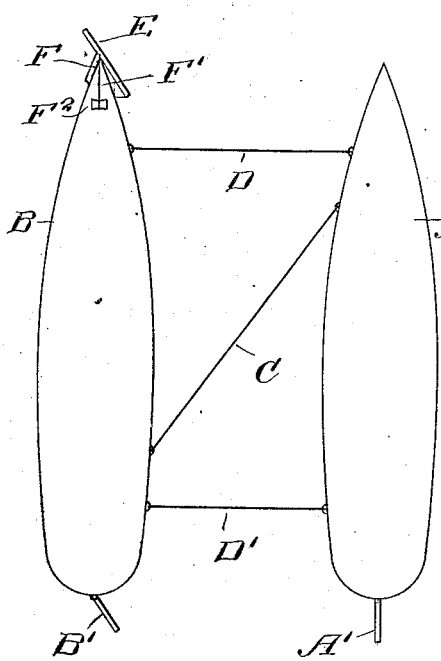
Figure 2:
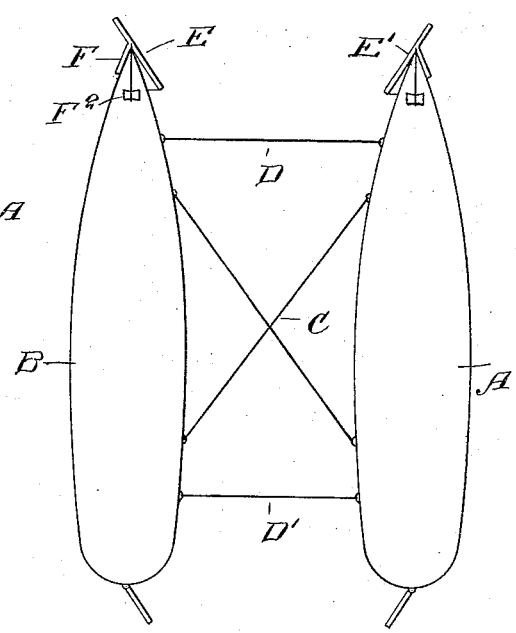
Figure 3:
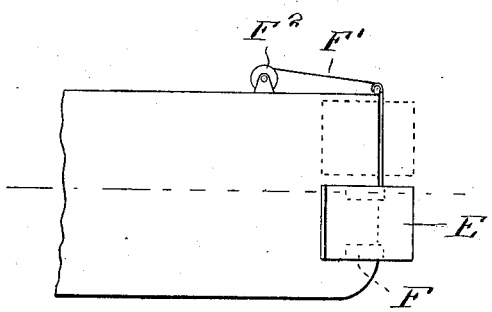

Figure 1 is a diagrammatic plan view of the invention as employed in connecting two vessels while one is being towed by the other. Fig. 2 is a similar view of the invention as employed in connecting two vessels when both vessels are driven forward under their own power. Fig. 3 is a view of one of the deflectors.

Referring to the drawings A and B designate two vessels, which, for purposes of illustration, may be considered as representing a collier and a merchant or naval vessel to be coaled therefrom, it being understood that at least one of the vessels, such, for example, as the vessel A, must be provided with its own driving or propelling power. It may be assumed that the vessel B is also provided with its own power or driving plant and is a ship which is to be towed by the vessel A, or that said vessel is to be coaled from the vessel A, while said vessels are moving foward and it is desired to maintain the same in broadside or parallel relationship for convenience in transhipping materials, supplies or coal from one vessel to the other. As a necessary and component part of each vessel, to be employed as an element in the different adaptations of the invention, it is of course to be understood that each vessel is provided with a rudder A′ and B′, respectively, or other means of steering.

In carrying the invention into practice for connecting and maintaining in fixed relation two vessels while one is being towed by the other I provide a diagonal tow line or cable C (Fig. 1) which is secured to each vessel, at such points as will establish a line of pull which will cause the vessel B to move ahead with the vessel A, with the least possible degree of lateral thrust or sidewise motion. To limit the spread or lateral separation of the vessels, front and rear transverse limitation lines, cables or hawsers are employed and connected with the bow and stern portions of the vessels at desired distances from the midship lines according to the respective lengths of the vessels. These limitation lines D and D′ establish resistances to the movement of the bow or stern portions of the vessel beyond a predetermined distance. When the vessel A is driven under its own power and acts as a towing vessel for the vessel B, its forging resistance through the water being fixed and stable, the rudder A′ is employed for steering purposes to set and maintain the steering course. The vessel B, however, being inert as a driving factor, having none of its own while progressing under the conditions mentioned, must be held against lateral deflection and for this purpose the rudder B' is swung inwardly, as shown in Fig. 1, to such an angle as to establish a stern resistance to prevent the stern portion of the vessel B from swinging inward toward the stern portion of the vessel A and to maintain the line taut, while at the bow of said vessel B a deflector or resistance element E is employed to similarly establish a bow resistance to keep the bow portion of the vessel B from swinging toward the bow portion of the vessel A and to thereby maintain the cable D taut. Hence as the two vessels travel forward under the power of the vessel A, the sidewise resistance devices D and D' and the stern and bow resistance devices B' and E will mutually contribute to a given result, namely, that of counteracting and resisting the tendency of the vessel B to move sidewise in either direction out of parallelism with the vessel A under the lateral pull of the tow line C and the usual wind and water resistances. As a result both vessels may proceed forward at the desired rate of speed under the power of one of the vessels while the vessels are maintained in parallel relation for convenience, of communication or to transfer materials from one to the other, as will be readily understood. The deflector or resistance device E may consist of a board or plate presenting sufficient broadside surface for the purpose and provided with suitable means F to engage the bow of the vessel, said deflector being lowered for use, supported in use and raised aboard ship when not in use by suitable means, and disposed upon the deck or other suitable portion of the vessel. Where both vessels are proceeding forward under their joint driving power, the propelling mechanism of each vessel being in action, it is advisable to provide two tow lines C as shown in Fig. 2 for equalizing the draft or pull of each upon the other and to prevent one boat outtraveling the other, as well as to maintain them in spaced relationship. As also shown in this view a deflector E' similar to the deflector E may be employed upon the bow of the vessel A.

I have also shown, in Fig. 2, a pair of the cables C which may be arranged in cross relationship and employed to connect each of the vessels with the other in the manner previously described, so as to increase the strength and security of the towing connections in rough weather and under other conditions.

I claim:—

1. A method of connecting and maintaining two moving vessels in broadside relation, and transmitting pulling power from at least one of the vessels to the other, which consists in establishing a draft line at an angle between points in advance of the transverse center of one vessel and in rear of the transverse center of the other vessel, establishing resistances between the bow and stern portions of the vessels against a predetermined lateral separation, and also establishing a resistance at the bow and stern of at least one of the vessels to resist lateral motion of said vessel with respect to the line of travel of the other vessel.

2. A method of connecting and maintaining two moving bodies in broadside relation and transmitting pulling power from each of said vessels to the other, which consists in establishing diagonal draft lines at a crossing angle between points in advance of the transverse center of each vessel and in rear of the transverse center of the other vessel, establishing resistances between the bow and stern portions of the vessels against more than a predetermined lateral separation, and also establishing water resistances at the bow and stern portions of the vessels to resist lateral motion of each vessel with respect to the line of travel of the other vessel.

3. Means for connecting and maintaining two moving vessels in broadside relation and transmitting pulling power from at least one of said vessels to the other, comprising a draft connection extending at an angle from a point in advance of the center line of the vessel to a point in rear of the center line of the other vessel, transverse resistance elements between the bow and stern portions of the respective vessels, and bow and stern resistance devices upon at least one of said vessels.

4. Means for connecting and maintaining two moving vessels in broadside relation and transmitting pulling power from a vessel to another, comprising a draft connection extending at an angle from a point in advance of the center line of one vessel to a point in rear of the center line of the other vessel, transverse resistance elements between the bow and stern portions of the respective vessels, bow and stern resistance devices upon at least one of said vessels, and a means for raising and lowering the said bow resistance device.

5. Means for connecting and maintaining two moving bodies in broadside relation and transmitting pulling power from each of said vessels to the other, comprising draft lines extending diagonally at a crossing angle between points in advance of the transverse center of each vessel and in rear of the transverse center of the other vessel, transverse resistance lines between the bow and stern portions of the vessels, and bow and stern resistance devices upon the vessels operating under the pressure of the water to hold the vessels spaced apart to the extent allowed by said transverse resistance lines.

6. A method of connecting and maintaining two moving vessels in broadside relation and transmitting pulling power from at least one of the vessels to the other which consists in establishing a draft line between adjoining sides of said vessels establishing resistances between the bow and stern portions of the vessels against a predetermined lateral separation and also establishing resistances at the bow and stern of one of said vessels to resist lateral motion of said vessel toward or away from the line of travel of the other vessel.

In testimony whereof I affix my signature in presence of a witness.

HENRY J. HARRIS.

Witness:
BENNETT S. JONES.

Copies of this patent may be obtained for five cents each, by addressing the "Commissioner of Patents, Washington, D. C."